US008358971B2

(12) United States Patent
Schiff

(10) Patent No.: US 8,358,971 B2
(45) Date of Patent: Jan. 22, 2013

(54) SATELLITE-BASED PROGRAMMABLE ALLOCATION OF BANDWIDTH FOR FORWARD AND RETURN LINKS

(75) Inventor: Leonard N. Schiff, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2260 days.

(21) Appl. No.: 10/602,355

(22) Filed: Jun. 23, 2003

(65) Prior Publication Data

US 2004/0097192 A1 May 20, 2004

Related U.S. Application Data

(60) Provisional application No. 60/398,157, filed on Jul. 23, 2002.

(51) Int. Cl.
*H04B 7/185* (2006.01)

(52) U.S. Cl. ...... 455/12.1; 455/427; 455/428; 455/11.1; 455/13.1; 455/13.2

(58) Field of Classification Search ................. 455/12.1, 455/427, 428, 11.1, 13.1, 13.2
See application file for complete search history.

(56) References Cited

U.S. PATENT DOCUMENTS 3,995,801 A 12/1976 Bond
4,502,051 A 2/1985 Dondl
4,688,259 A 8/1987 Edridge
4,858,225 A 8/1989 DeSantis
4,965,587 A 10/1990 Lenormand et al.
5,020,746 A 6/1991 Anzel
5,120,007 A 6/1992 Pocha et al.
5,175,556 A 12/1992 Berkowitz
5,289,193 A 2/1994 Lenormand et al.
5,297,134 A 3/1994 Takahashi et al.
5,323,322 A 6/1994 Mueller et al.
5,355,138 A 10/1994 Cances et al.
5,410,731 A 4/1995 Rouffet et al.
5,483,664 A * 1/1996 Moritz et al. ................. 455/428
5,500,648 A * 3/1996 Maine et al. ............. 342/357.05
5,523,997 A 6/1996 Bishop, Jr.
5,551,624 A * 9/1996 Horstein et al. .......... 244/158 R (Continued)

FOREIGN PATENT DOCUMENTS

CN 1359561 A 7/2002
EP 0658014 6/1995

(Continued)

OTHER PUBLICATIONS

CN OA from CN 03822645.6; dated Aug. 4, 2008.

(Continued)

*Primary Examiner* — Temesgh Ghebretinsae
*Assistant Examiner* — Richard Chan
(74) *Attorney, Agent, or Firm* — Jeffrey D. Jacobs

(57) ABSTRACT

A satellite includes a programmable facility including circuitry responsive to programmable control information. One or more filter parameters, or other forms of instructions for allocating channel capacity (i.e. bits/second/Hz), are received at the satellite in orbit to direct the programmable facility to separate particular sub-signals from an input signal. In one embodiment, the programmable facility can be programmed to change the allocation of channel capacity dedicated to the forward and return links based on the ratio forward and return traffic through a satellite. Changing the allocation of channel capacity may be achieved by changing the portions of the total allocated frequency bandwidth that are used for forward and return links. Alternatively, the changes may be made to the forward and/or return data rates, either alone or in combination with frequency bandwidth allocations.

19 Claims, 10 Drawing Sheets

U.S. PATENT DOCUMENTS 5,552,798 A * 9/1996 Dietrich et al. ............... 343/893
5,563,880 A 10/1996 Sabourin et al.
5,790,954 A * 8/1998 Tayloe et al. ................. 455/437
5,794,120 A 8/1998 Cutler, Jr. et al.
5,813,634 A 9/1998 Pizzicaroli et al.
5,822,680 A * 10/1998 Stuart et al. .................. 455/12.1
5,860,056 A 1/1999 Pond
5,862,479 A 1/1999 Cutler, Jr. et al.
5,871,181 A * 2/1999 Mass ......................... 244/158 R
5,890,679 A 4/1999 Chethik
6,192,217 B1 2/2001 Farrell
6,192,240 B1 * 2/2001 Tayloe et al. ................. 455/428
6,215,776 B1 4/2001 Chao
6,219,003 B1 4/2001 Chandler
6,246,874 B1 6/2001 Voce
6,272,345 B1 8/2001 Worger et al.
6,317,412 B1 11/2001 Natali et al.
6,317,420 B1 11/2001 Schiff
6,507,926 B1 1/2003 Wright
6,587,687 B1 * 7/2003 Wiedeman .................... 455/428
6,704,543 B1 3/2004 Sharon et al.
6,707,916 B1 3/2004 Caso et al.
6,810,249 B1 10/2004 Walsh et al.
6,813,492 B1 11/2004 Hammill et al.
6,836,658 B1 12/2004 Sharon et al.
7,024,158 B2 * 4/2006 Wiswell ....................... 455/12.1
7,308,229 B2 * 12/2007 Hane et al. ................... 455/3.02
7,379,758 B2 5/2008 Schiff et al.
7,525,934 B2 4/2009 Ames et al.
7,587,171 B2 * 9/2009 Evans et al. .................. 455/63.1
7,650,379 B2 * 1/2010 Hart et al. ..................... 709/203
2001/0034206 A1 10/2001 Thompson et al.
2002/0089943 A1 7/2002 Faineant et al.
2002/0160708 A1 * 10/2002 Hane et al. ................... 455/3.06
2002/0169669 A1 11/2002 Stetson et al.
2003/0001773 A1 1/2003 Harmon et al.
2003/0073436 A1 4/2003 Karabinis et al.
2004/0010610 A1 1/2004 Cypher
2004/0097192 A1 * 5/2004 Schiff .......................... 455/12.1
2007/0021060 A1 1/2007 Karabinis et al.
2007/0077884 A1 4/2007 Regulinski et al.
2009/0051589 A1 2/2009 Schiff et al.

FOREIGN PATENT DOCUMENTS

EP 0854590 7/1998
EP 1065806 A2 1/2001
EP 1085680 3/2001
EP 1014598 A2 10/2004
JP 8510609 11/1996
JP 11501468 2/1999
JP 11150500 A 6/1999
JP 2003078464 A 3/2003
WO WO0103310 A1 1/2001
WO WO2004010610 1/2004

OTHER PUBLICATIONS

CN OA from CN03822645.06; dated Nov. 23, 2009.
EP OA from EP 03765995.0; dated Sep. 4, 2009.
European Search Report—EP08013456—Search Authority—The Hague—May 3, 2011.
International Search Report—PCT/US2003/23069—ISA/EPO—Oct. 31, 2003.
OA dated Nov. 3, 2006 for U.S. Appl. No. 10/624,257; 27 pages.
OA dated Mar. 29, 2010 for Korean Patent Application No. 2005-7001314; 8 pages.
OA dated Jun. 15, 2007 for U.S. Appl. No. 10/624,257; 32 pages.

* cited by examiner

SATELLITE-BASED PROGRAMMABLE ALLOCATION OF BANDWIDTH FOR FORWARD AND RETURN LINKS

RELATED APPLICATIONS

This application claims the benefit of prior filed provisional application 60/398,157; filed on Jul. 23, 2002.

FIELD OF THE INVENTION

The present invention pertains to the field of satellite communications. More particularly, this invention relates to satellite-based programmable signal filtering.

BACKGROUND OF THE INVENTION

A satellite receives a signal from a transmitter at one location and forwards the signal to a receiver at some other location. By "bouncing" signals off satellites, satellite systems can provide communications virtually anywhere. Satellite systems can also be comparatively inexpensive because very little land-based infrastructure, such as, for example, telephone lines and cellular towers, is needed to cover very large areas and/or very long distances. These advantages make satellite systems ideal for a wide variety of applications, including high speed data communications.

In an exemplary satellite system, user terminals communicate with a "gateway" through a satellite. In such an exemplary system, the terminals and the gateway are typically on Earth, while the satellite is in orbit. The gateway provides access for the terminals to outside networks. For instance, the gateway may include an Internet access point so that the terminals can access the World Wide Web, send and receive email, etc., through the satellite and the gateway.

The various communications links in such a satellite system include an "uplink," "downlink," "forward link," and "return link." An uplink includes the signals that the satellite receives from Earth. A downlink includes the signals that the satellite sends down to Earth. A forward link includes the signals going from the gateway to the terminals, while a return link includes the signals going from the terminals to the gateway. In which case, the uplink includes two sub-links, both a forward link component and a return link component. The sub-links in the uplink are occasionally referred to herein as a forward/uplink and a return/uplink. And, the downlink includes two sub-links, both a forward link component and a return link component. The sub-links in the downlink are occasionally referred to herein as a forward/downlink and a return/downlink.

In order for the satellite to send and receive signals without the signals interfering with one another, the satellite often separates the uplink and the downlink into separate frequency bands. For illustrative purposes, consider that a satellite may be allowed to use 1 GHz of bandwidth with a center frequency of 12 GHz. In which case, any number of filtering techniques can be used to separate the 1 GHz bandwidth into two separate bands. If the bands are 500 MHz each, one band may be centered around 11.75 GHz and the other centered around 12.25 GHz. Using two separate bands, the satellite does not simply "bounce" signals. Rather, the satellite receives signals in one of the two bands, translates the signal to the other band, and retransmits the signal in that other band. A number of known techniques exist and can be used to translate a signal from one frequency band to another. It is noted that the uplink and downlink bands are neither necessarily nor typically frequency contiguous. For example, the Ku band has a noncontiguous allocation of frequencies as between the uplink and downlink portions. More particularly, the Ku band downlink frequency allocation is 11.7 GHz to 12.2 GHz, while the Ku band uplink frequency allocation is 14.0 GHz to 14.5 GHz.

In addition to separating the uplink from the downlink, the forward link is often handled differently than the return link in a satellite. For instance, a gateway usually has both a larger, higher quality transmitter and receiver than do the terminals. In view of the disparity between the receiver and transmitter of the gateway, and the receiver and transmitter of the terminal, it is often the case that the return traffic from the terminals is likely to need a different amount of gain, or amplification, in the satellite than does the forward traffic. In which case, additional filtering can be used to separate the forward and return links. Once separated, different amounts of gain can be applied to the uplink components (e.g., more gain applied to return uplink signals than to forward uplink signals).

A pair of transponders can be used to operate, respectively, with the signals of the forward and return links individually. One of the transponders can be designed to receive the forward uplink, filter out other frequencies, apply a first amount of gain, and translate the received signal to the forward downlink. The other transponder can be designed to receive the return uplink, filter out other frequencies, apply a second amount of gain, and translate the signal to the return downlink. A conventional transponder is usually designed to operate with a particular frequency band. In order to operate with a different frequency band, a different transponder design may be needed.

The amount of data which the forward and reverse links are designed to carry may be different. These differences are typically the result of the intended uses of the communication system. The growth of the Internet, and in particular the growth of web browsing, is one of the factors that can determine the allocation of bandwidth between the forward and reverse links in a communication system. The forward link is often designed to handle a larger volume of data than the return link. For instance, when a user clicks on a link to a website, a small amount of data travels in the return link through the satellite and the gateway, out to the Internet, to a server machine where the website is stored. Then, a comparatively large amount of data travels in the forward direction from the Internet, through the gateway and satellite, back to the terminal in order to display the information requested from the website. The ratio of forward to reverse traffic is typically designed to be around 8 to 1, 10 to 1, or 15 to 1. For instance, a satellite may have 10 times more frequency bandwidth allocated to forward traffic than to return traffic in order to carry 10 times more data in the forward link. Using a pair of transponders, one transponder would operate with a frequency band 10 times larger than would the other transponder.

The actual ratio of forward to reverse traffic, however, may change over time as new network applications and new groups of users, with different usage behaviors, develop. For instance, most web traffic is currently server-based, with a large number of users accessing data located at a much smaller number of servers. These users tend to have high forward to reverse traffic ratios because they usually receive a great deal more data than they transmit. If peer-to-peer web traffic emerges as a viable alternative however, many users will serve data as well as consume it, pushing the forward to reverse ratio toward 1 to 1. Email traffic and video conferencing are also examples of network traffic that could bring the ratio of forward to return traffic closer to 1 to 1.

A satellite typically has a service life in excess of 15 years. Over a 15 year time span, the actual forward-to-reverse ratio of data traffic may change dramatically. Changing the forward-to-reverse bandwidth, or channel capacity, allocations to accommodate a change in actual forward-to-reverse data traffic would normally involve replacing transponders. But, replacing transponders in a satellite in orbit is likely to be prohibitively expensive if not impossible. Therefore, a need exists for satellite-based programmable signal filtering.

SUMMARY

A satellite includes a programmable facility, such as for example, one or more signal filters, so that the relative frequency bandwidth allocations of the forward and return links may be altered. Alternatively, the ratio of the data rates between the forward and return links may be altered. In operation, a filter parameter is received at the satellite in orbit, and is used to program the programmable facility to separate particular sub-signals from an input signal. In various embodiments, the programmable facility can be programmed to change a forward-to-reverse ratio for data traffic carrying capacity through the satellite by altering the allocation of frequency bandwidth to the forward and return links. In alternative embodiments, the ratio of forward-to-reverse data rates, either alone or in combination with changes in bandwidth allocations, may be made.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As is well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention provide satellite-based programmable signal filtering. Embodiments of the present invention can be used to, for instance, change the forward-to-reverse ratio for two-way traffic through one or more satellites while in orbit. The processing architecture used in various embodiments of the present invention can be used for a variety of other applications, such as flexible switching among various links and reprogramming of various frequency bands.

Figure 1:
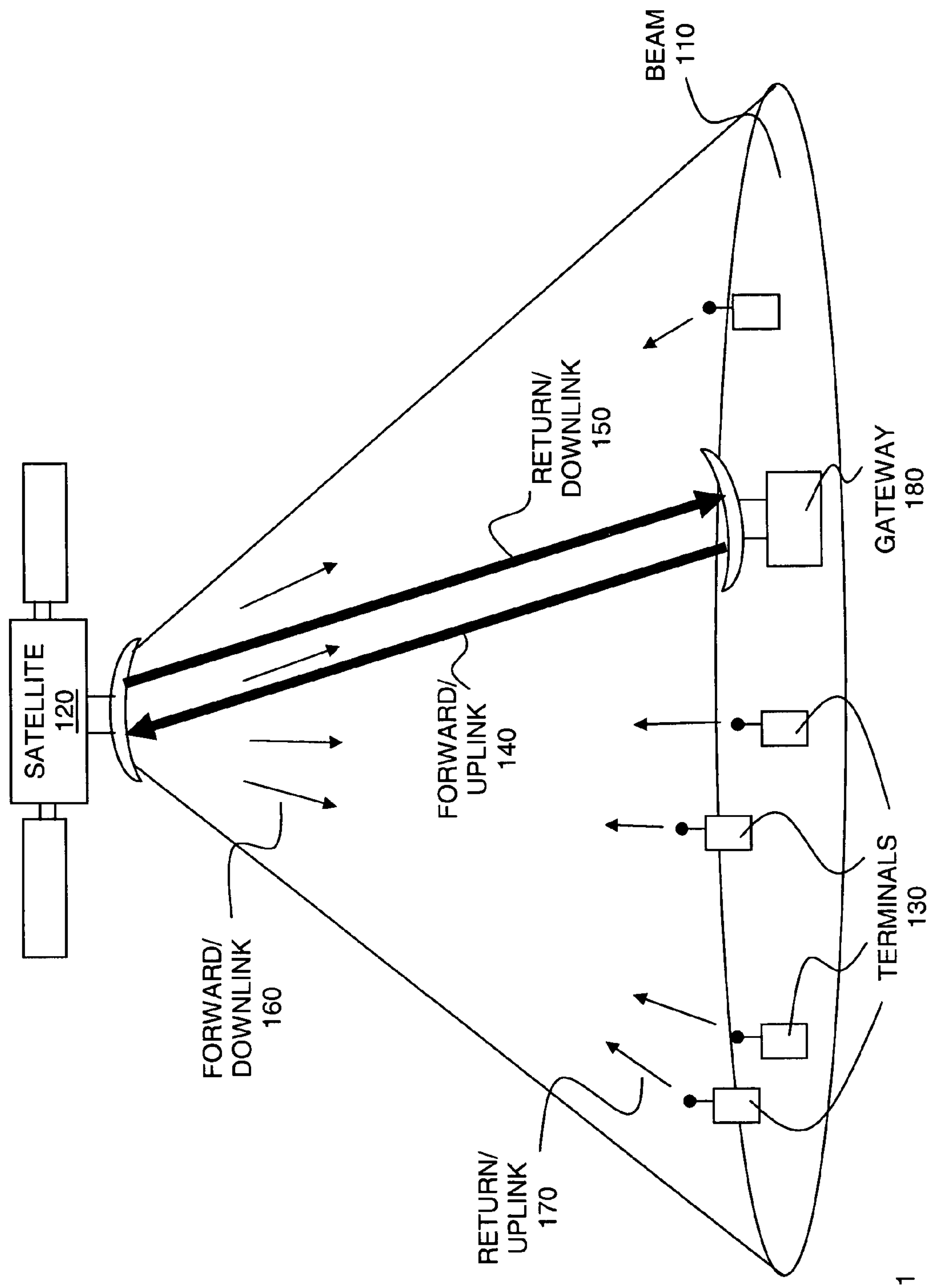
FIG. 1 illustrates one embodiment of a satellite system.

FIG. 1 illustrates a satellite system incorporating one embodiment of the present invention. A satellite 120 projects a beam 110 onto the ground. There are several ground stations within the beam 110, including a gateway 180 and a number of terminals 130. The gateway 180 could, for instance, provide access to the Internet or some other external network (not shown). The terminals 130 communicate with the external network through the satellite 120 and the gateway 180.

Beam 110 includes four types of communication links. Forward/uplink 140 includes signals transmitted from the gateway 180 to the satellite 120. Return/downlink 150 includes signals transmitted from the satellite 120 to the gateway 180. Forward/downlink 160 includes all signals transmitted from the satellite 120 to the terminals 130 in beam 110. Return/uplink 170 includes signals transmitted from the terminals 130 to the satellite 120.

The forward/uplink 140 and the return/uplink 170 together comprise the uplink, including all signals going to the satellite 120. The forward/downlink 160 and the return/downlink 150 together comprise the downlink, including all signals being transmitted from the satellite.

Forward/uplink 140 and forward/downlink 160 together comprise the forward link, including all signals going from the gateway 180 to the terminals 130. Return/uplink 170 and return/downlink 150 together comprise the return link, including all the signals going from the terminals 130 to the gateway 180.

The satellite 120 uses a certain amount of frequency bandwidth for the beam 110. That bandwidth is divided among the four types of communications links. Generally, the ratio of the amount of bandwidth allocated between the forward link and the return link determines the relative amount of data that can be carried by each link. It is noted, that there is not necessarily a one-to-one relationship between the amount of bandwidth allocated to a link and the data rate which is sustainable over that link. As will be understood, the amount of bandwidth which is allocated to a link, is not the only factor in determining the amount of data that can be transmitted in a given amount of time (i.e., the data rate) on that link. For example, different modulation schemes, or techniques, may be more or less spectrally efficient. Further, the ability to use higher order modulation schemes may also depend on the power available at the transmitter, or the sensitivity of the intended receiver. In fact, those skilled in the art will appreciate that it is possible to use the concept of channel capacity (i.e., bits/second/Hz), rather than bandwidth alone, to illustrate the context of the present invention. However, with respect to the illustrative description, and bearing in mind the impact of factors such as modulation scheme on data rate, the bandwidth ratio is intended to resemble the ratio of actual data volume in the forward and return links so that neither link becomes a bottleneck for the system. Assuming the ratio of forward to return traffic remains fairly constant as total data volume increases, if the ratio of forward bandwidth to return bandwidth is not equal to the actual ratio of forward to return data traffic, either the forward link or the return link will "saturate," or reach a maximum data capacity, before the other link. Furthermore, under these circumstances, the unsaturated link will have data capacity left unused.

Various embodiments of the present invention can use satellite-based, programmable signal filtering, or programmable frequency bandwidth allocation, to change the ratio of bandwidth between the forward and return links. For instance, the actual ratio of data volume (i.e., traffic) in the forward and reverse links can be monitored over time. If that ratio changes such that a certain amount of data capacity is left unused in one link when the other link saturates, embodiments in accordance with the present invention can change the ratio of frequency bandwidth allocated to the various links to more closely match the actual ratio of forward to reverse traffic, thereby reducing the amount of data carrying capacity left un-used. Any number of approaches can be used to monitor the actual ratio of data traffic in the forward and return links and to determine when the ratio of forward to return bandwidths should be adjusted.

Figure 2:
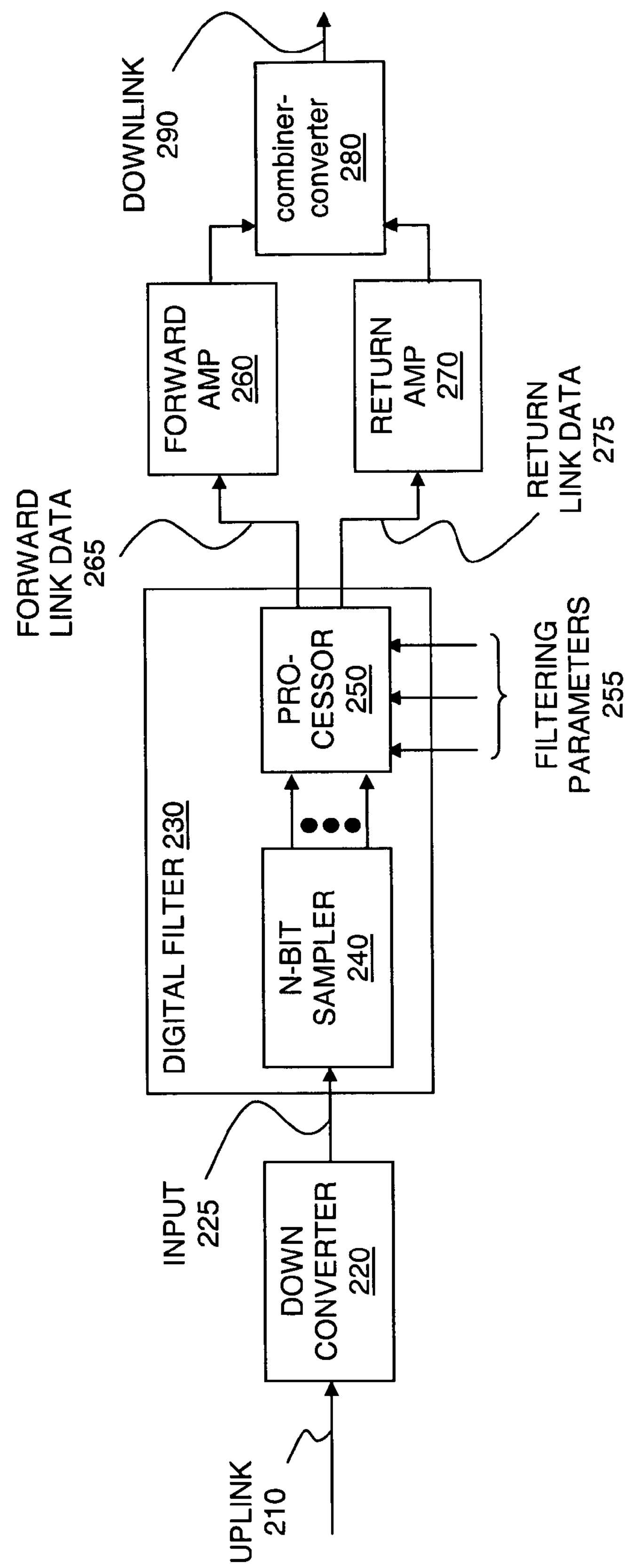
FIG. 2 illustrates one embodiment for a single-beam in a satellite system.

FIG. 2 illustrates one embodiment of a programmable signal filter for use in a satellite such as the satellite 120 from FIG. 1. Rather than using a pair of specially designed transponders to filter the various frequency bands, the illustrated embodiment uses a programmable digital filter 230. The digital filter 230 includes an N-bit sampler 240 to sample an input signal 225 at a particular sample rate and quantize each sample into an Nbit value. The sample rate and the number of bits N are selected so that the input signal 225 can be reliably reconstructed from the samples. The sample frequency is at least twice the maximum desired frequency in the input signal 225. The number of bits N depends on the desired granularity of samples. A four bit sample, for instance, can distinguish 16 levels, five bits can distinguish 32 levels, and so on.

The illustrated embodiment also includes a down converter 220 that receives an uplink 210 before the uplink reaches the digital filter 230. Uplink 210 may be centered around a comparatively high center frequency. For instance, the center frequency could easily be 10 to 30 GHz. Since the sampler 240 samples at a rate that is at least twice the highest desired frequency of the input signal 225, the sampler 240 would have to sample at over 20 to 60 GHz to reliably capture the uplink 210. A digital sampler that can sample at 20 to 60 GHz is likely to be prohibitively expensive, if not currently impossible to build, especially when using a large number N of sample bits. Using the down converter 220, to produce a lower frequency signal, allows for the use of lower sampling frequencies, and, therefore, an easier to design, and less expensive, sampler 240 can be used.

Down converter 220 translates, or mixes-down, the signals of uplink 210 in the analog domain. Many techniques for down conversion are known in the art and, therefore, those techniques are not presented in greater detail here. In one embodiment, the down converter 220 translates the uplink 210 so that the lowest frequency of the uplink signal is reduced to slightly above zero Hertz, the center frequency of the uplink signal is slightly more than one-half of the uplink frequency bandwidth, and the high frequency of the uplink signal is slightly more than the uplink frequency bandwidth. The frequencies are all "slightly more" by a particular frequency margin. This frequency margin is intended to be the lowest practical frequency that can be digitally sampled by the sampler 240. So, for example, if the bandwidth of the uplink 210 is 100 MHz, the center frequency of the uplink 210 is 15 GHz, and the lowest practical frequency that sampler 240 can sample is 5 MHz, then illustrative down converter 220 converts uplink 210 to a low frequency of 5 MHz, a center frequency of 55 MHz, and a high frequency of 105 MHz.

In any event, once the input signal 225 is digitally sampled, the digital samples are then processed by processor 250. The processor 250 represents a broad category of processing elements, including one or more digital signal processors (DSPs), one or more general purpose processors, an interface to a remote processor, and the like. The processor 250 performs a digital algorithm based on the filtering parameters 255 to separate the samples into forward link data 265 and return link data 275. Any number of digital filtering algorithms can be used.

Filtering parameters 255 can define the boundaries of the forward link 265 and the return link 275 in any number of ways. For instance, the low and high frequencies of input 225 may be fixed. In which case, a single parameter could be used to define the boundary. At least one of the parameters 255 is programmable. For instance, if a single parameter defines the boundary, that single parameter could be programmable. By changing the input parameters to the algorithm used by the processor 250, processor 250 is enabled to operate with different portions of the total allocated frequency bands for each of the illustrated forward and return links. The filter parameters 255 can be generated and stored on-board by the satellite by monitoring the data flow ratio and coordinating bandwidth ratio changes with the terminals and the gateway. Alternatively, the filter parameters 255 can be generated on the ground, at the gateway for instance, and then transmitted to the satellite whenever a change is desired or needed.

Once the data is divided into its forward and return links 265 and 275, each link is separately amplified. Forward link 265 is amplified by forward amplifier 260 and return link 275 is amplified by return amplifier 270. The return link data 275 from the terminals may require more gain than the forward link data 265. In the digital domain, the samples are amplified by multiplying each sample by a certain value. A larger multiplier provides larger gain. Any number of suitable digital amplifiers can be used for amplifiers 260 and 270.

The amplified data then arrives at combiner/converter 280. Combiner/converter 280 combines the digital samples, converts them back to analog, up-converts to the frequency band used by the uplink 290, and transmits the translated signal. In one embodiment, the digital samples are added in order to combine them. In alternative embodiments, any number of techniques can be used to combine the samples, covert to analog, up-convert, and transmit the downlink 290.

Figure 3:
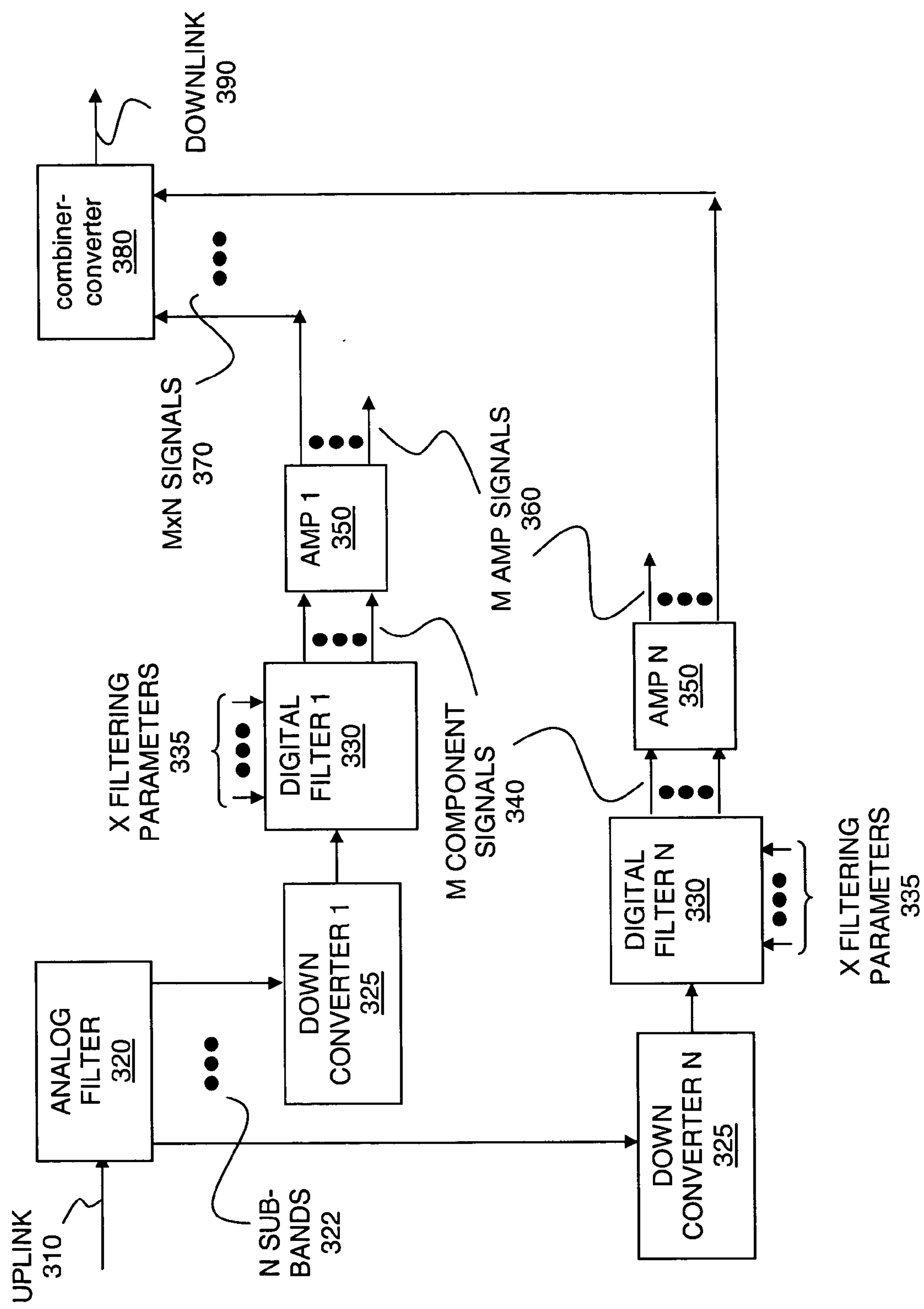
FIG. 3 illustrates one embodiment for a single-beam that is divided into sub-bands.

FIG. 3 illustrates another embodiment of a programmable signal filter for use in a satellite such as the satellite 120 from FIG. 1. The embodiment of FIG. 3 is designed to handle a wider bandwidth in the uplink 310 than the embodiment of FIG. 2. For instance, if the bandwidth of the uplink 310 is 500 MHz, then the digital filters 330 will have to sample faster than at least 1 GHz, even if the bandwidth is down-converted with the low frequency slightly more than zero Hertz. A 1 GHz sampler could be prohibitively expensive, especially with a large number of bits per sample. So, the analog filter 320 can filter the uplink 310 into a fixed set of N sub-bands 322. For instance, a 500 MHz band could be divided into 10 sub-bands of 50 MHz each.

Then, in the N down converters 325, each sub-band 322 is down converted. For instance, each sub-band 322 could be down converted so that a low frequency is slightly more than zero and a high frequency is slightly more than the width of the sub-band. Each down-converted signal is provided to one of N digital filters 330, which sample and quantize the signals into digital form before separating the samples into M component sub-signals 340 based on the X filtering parameters 335. At least one of the filtering parameters 335 is programmable.

In some embodiments, the number of component signals 340 separated out by each digital filter 330 is M=2. For instance, the digital filters could separate a forward link and a return link from each sub-band 322. In alternative embodiments however, as discussed below, the number of component signals can be more or less than 2, and the number of component signals can be different for different filters 330.

Each of the M component sub-signals 340 are amplified independently by one of N amplifiers 350 to produce M amplified signals 360 for each of the N sub-bands 322. The M×N signals 370 are then provided to combiner/converter 380. The combiner/converter 380 reverses the separation process. Specifically, the combiner/converter 380 matches and combines selected ones of the signals 370 into sub-bands, converts the sub-bands back to analog, translates each combined set of signals up to the bandwidth for the downlink 390, and transmits the combined signal as downlink 390. Any number of switch matrices, digital adders, analog adders, and the like can be used for combiner/converter 380.

Figure 4:
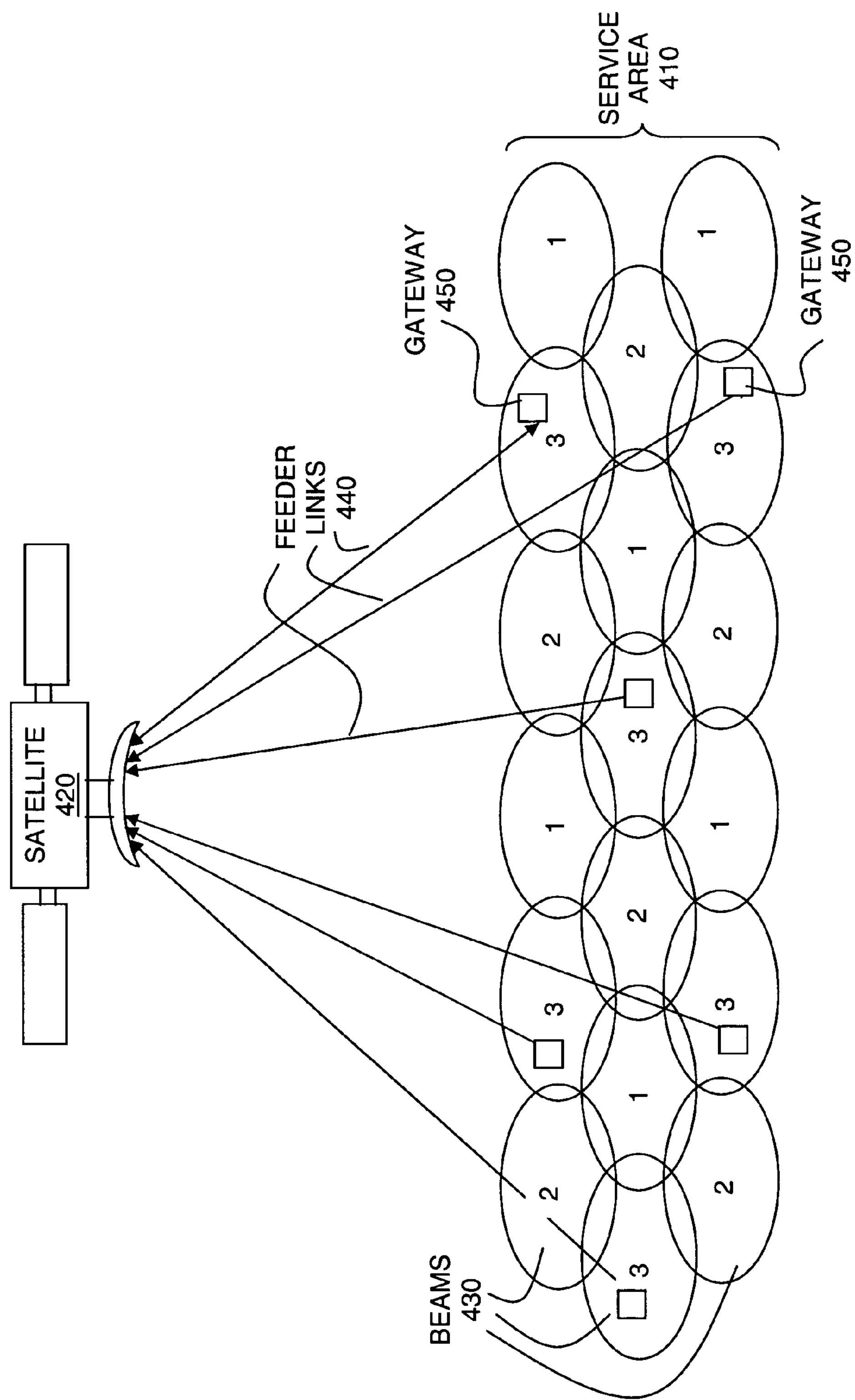
FIG. 4 illustrates another embodiment of a satellite system.

FIG. 4 illustrates another system in which an embodiment of the present invention can be used. Rather than providing a single beam, the satellite 420 divides its service area 410 into multiple beams 430. Each of the beams 430 is similar to the beam 110 in FIG. 1 in that each beam 430 services a number of ground stations, including potentially many terminals (not shown) and possibly a gateway 450.

Multiple-beam systems can be used to increase overall data capacity through the system by reusing the available frequency bandwidth. In the illustrated embodiment, there are 18 beams. Each beam uses one-third of the available frequency bandwidth for the return/uplink and the forward/downlink so that six of the 18 beams use the same frequency division. This arrangement can potentially increase the total data capacity through the system by the number of beams, N=18, divided by the number of frequency divisions, K=3, for an increase of a factor of 6 in this example.

In the illustrated embodiment, each of the beams 430 that use the first division of the available frequency bandwidth is marked with a 1. Each beam 430 that uses the second division is marked with a 2. And, each beam 430 that uses the third division, is marked with a 3. The beams 430 are arranged so that no two beams that use the same frequency band are adjacent. Separating beams that use the same frequency band reduces interference among beams.

Six gateways 450 can support all 18 of the beams 430. This is because three beams share the available bandwidth, and each gateway 450 can use the entire available bandwidth, so a single gateway can service three beams. Each feeder link 440 includes both the forward/uplink from a respective gateway to the satellite 420, and the return/downlink from the satellite 420 to a respective gateway, and each feeder link 440 carries data for three beams. As with the system of FIG. 1, embodiments of the present invention can program signal filtering at the satellite 420 to, for instance, change the forward to reverse bandwidth ratio within each of the beams 430.

Figure 5:
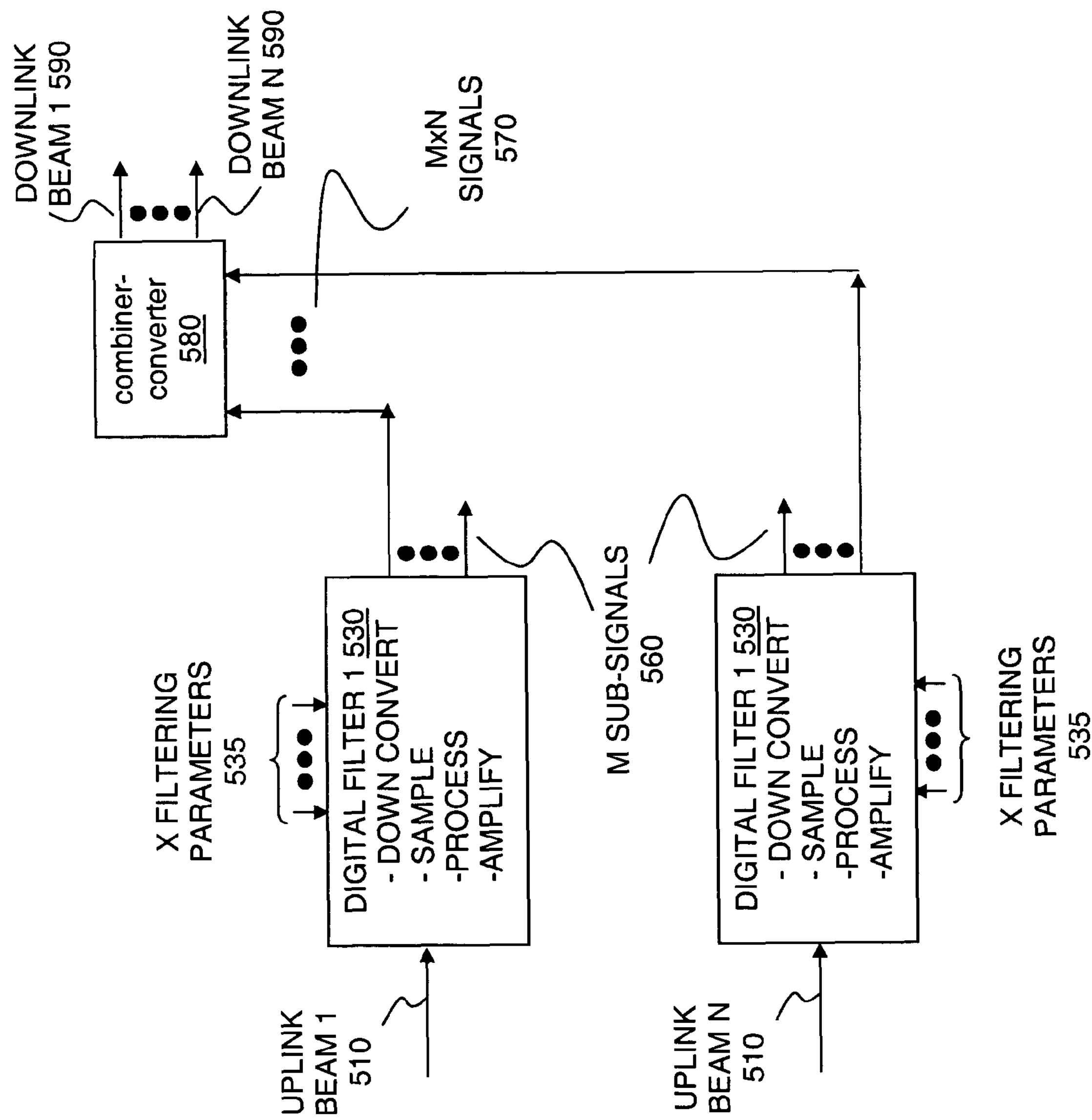
FIG. 5 illustrates one embodiment for a multi-beam satellite system.

FIG. 5 illustrates another embodiment of a programmable signal filter. The illustrated embodiment can be used in a multi-beam satellite such as the satellite 420 in FIG. 4. For an individual beam, the system operates very much like the system illustrated in FIG. 2. That is, each digital filter 530 may include elements similar to the down converter 220, the sampler 240, the processor 250, and the amplifiers 260 and 270 from FIG. 2. However, in FIG. 4, the uplink comprises N uplink beams 510. For instance, the satellite may include an array of antennas, each of which corresponds to one of the uplink beams 510. Each uplink beam 510 is received at one of N digital filters 530.

Each digital filter 530 down converts the respective uplink beam, samples and quantizes the down converted beam into digital data, processes the digital samples to separate M sub-signals based on the X filtering parameters 535, and selectively amplifies the separated sub-signals into M amplified sub-signals 560. The N digital filters 530 each generate M sub-signals 560. In certain embodiments, the number of signals M and/or the number of parameters X is different for different filters 530. At least one of the filter parameters 535 is programmable.

As in the embodiment of FIG. 3, the M×N signals 570 from the filters 530 are provided to combiner/converter 580. Again, the combiner/converter 580 reverses the separation process. But, rather than matching and combining selected ones of the signals 570 into sub-bands, combiner/converter 580 matches and combines selected signals into N downlink beams 590. Each combined set of signals is converted back to analog, translated up to the appropriate bandwidth, and transmitted in one of N downlink beams 590. Any number of switch matrices, digital adders, analog adders, and the like can be used for combiner/converter 580.

Using the satellite system of FIG. 4 as an example for the system of FIG. 5, N would equal 18 uplink beams 510 corresponding to the 18 beams in FIG. 4. Not every beam has forward/uplink data because only one out of three beams includes a gateway. In which case, the bandwidth in the uplink can be allocated in many different ways.

Embodiments of the present invention can be used to accommodate a wide variety of bandwidth allocations among links, beams, sub-signals, and the like, as well as reprogram bandwidth allocations to accommodate a wide variety of changes. Moreover, if the ratio of forward to reverse traffic changes over time, the system could be reprogrammed to accommodate the change.

Figure 6:
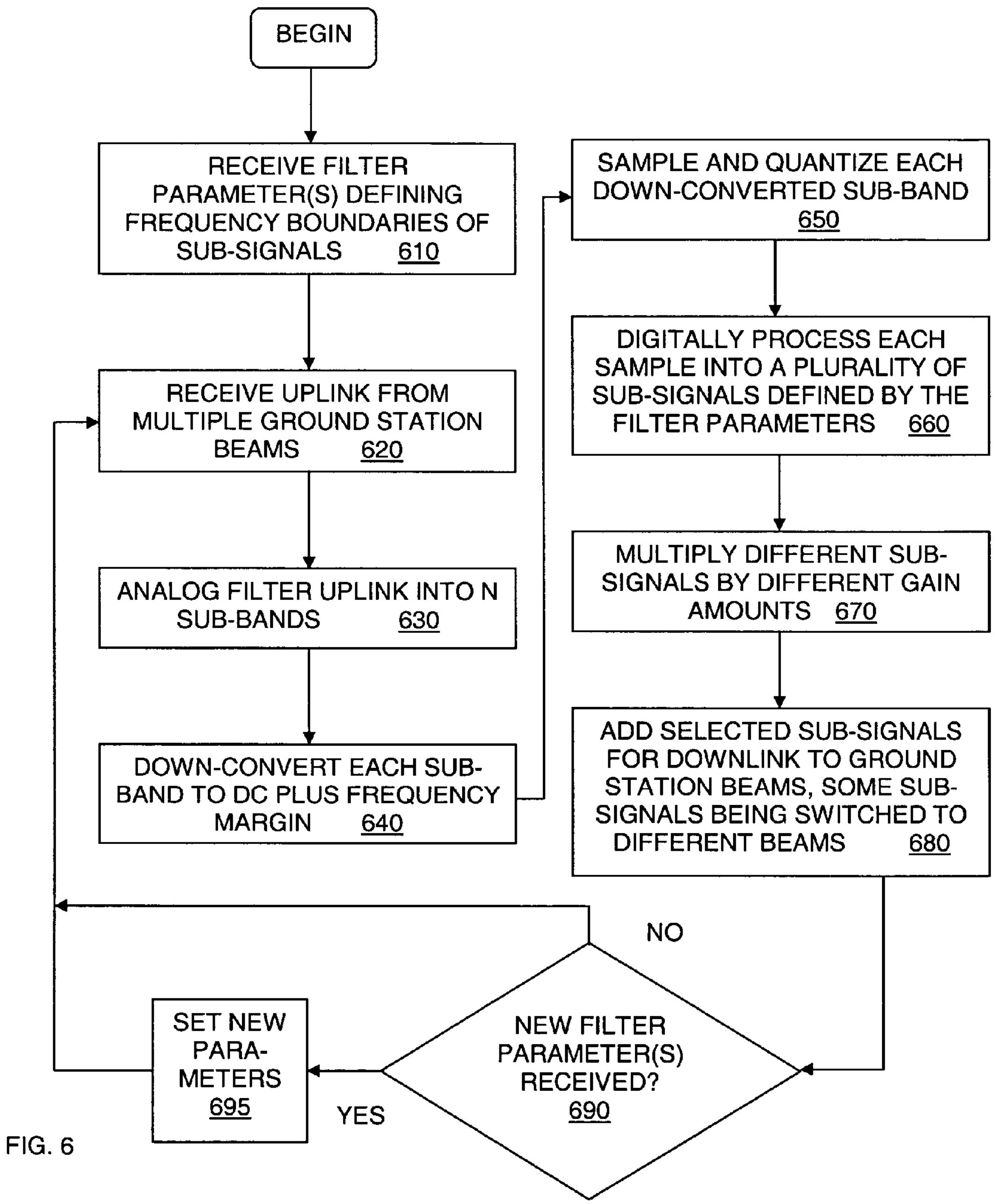
FIG. 6 is a flowchart for one embodiment of the present invention.

FIG. 6 illustrates a flow diagram of one embodiment. In general, the illustrated embodiment programmably filters various signals. The illustrated embodiment includes a number of implementation specific details and alternate embodiments need not include all of the illustrated elements, may include additional elements, may perform elements in a different order, combine one or more elements, and the like.

At 610, the system receives filter parameter(s) that define the frequency boundaries of sub-signals. For instance, filter parameters may include a low frequency, a high frequency, and a middle frequency. The low and high frequency may be fixed and the values may be stored in permanent memory within the satellite. In which case, the parameter received at 610 could be a single value or offset of the middle frequency.

At 620, an uplink is received from multiple ground stations. In one embodiment, the ground stations include both a number of terminals and a gateway. At 630, the uplink is filtered in the analog domain into a fixed set of N sub-bands.

For instance, this element may be useful when the high frequency of the bandwidth is too high for sampling, even if the uplink is down converted.

At 640, each sub-signal is down converted. In the illustrated embodiment, each sub-signal is down converted to a point at which the low frequency of the bandwidth of a sub-signal is at zero hertz, DC, plus a frequency margin. At 650, the down-converted signal is digitally sampled and quantized. At 660, each sample is digitally processed to separate a plurality of sub-signals as defined by the filter parameters.

At 670, different sub-signals are multiplied by different gain amounts. In one embodiment, return/uplink traffic receives more gain than forward/uplink traffic. At 680, selected sub-signals are added and prepared for downlink transmission. Some sub-signals are switched into beams other than the beams in which they arrived.

At 690, the system checks for new filter parameters. If no new parameters have been received, the system loops back to processing step or block 620 and continues processing signals using the previously set parameters. If new parameters are received at 690, the new parameters are set in place of the old at 695, and the system loops back to block 620 to continue processing using the new parameters.

Figure 7:
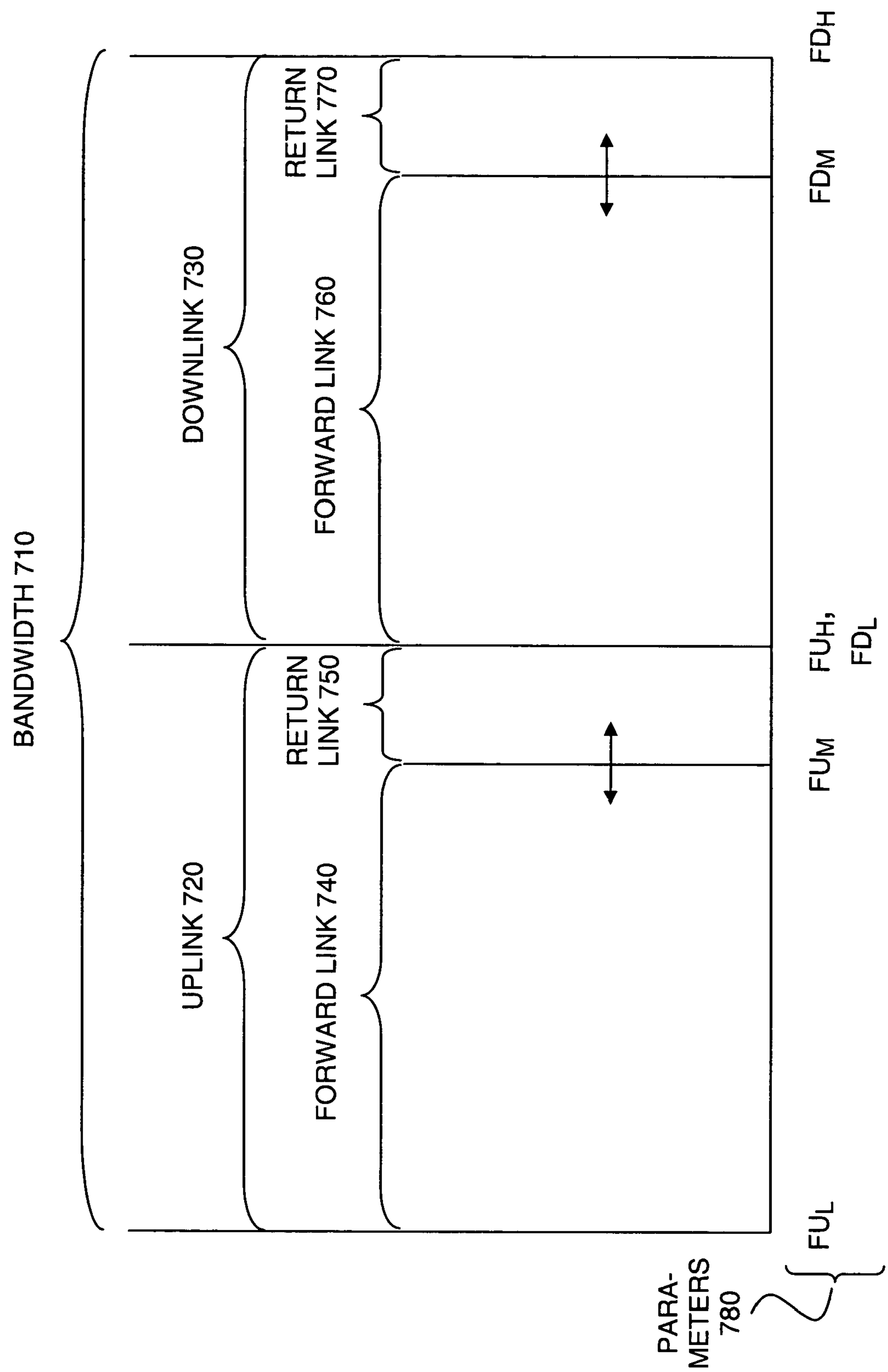
FIG. 7 illustrates one embodiment of the allocation of bandwidth among various links for a single beam.

FIG. 7 illustrates one embodiment of how bandwidth is allocated among various communications links for a single beam. The bandwidth 710 comprises the bandwidth available to a beam. The bandwidth 710 is divided equally between the uplink 720 and the downlink 730. That is, the satellite receives the same amount of data that it transmits. So, both the uplink 720 and the downlink 730 use an equal amount of bandwidth. Each of the equal sections of bandwidth is divided into forward and return portions. Specifically, the uplink 720 is divided into forward link portion 740 and return link portion 750. The downlink 730 is divided into forward link portion 760 and return link portion 770. Again, the forward link portions, 740 and 760, use equal amounts of bandwidth in both the uplink 720 and the downlink 730 because the satellite receives and transmits the same amount of forward data. The same is true for the return link portions, 750 and 770.

The boundaries between portions of bandwidth are defined by the parameters 780. The uplink 720 is defined by a low frequency, $FU_L$, a middle frequency, $FU_M$, and a high frequency, $FU_H$. The downlink 730 is defined by a similar set of frequency parameters, $FD_L$, $FD_M$, and $FD_H$. In the illustrated embodiment, according to the teachings of the present invention, the middle frequencies, $FU_M$ and $FD_M$, are variable and programmable. That is, the ratio of forward-to-return bandwidth can be changed.

Given the symmetrical nature of the bandwidth 710, the parameters 780 can be defined in any number of ways. For instance, the set of parameters 780 could be defined using a center frequency at the middle of the bandwidth 710, a size for the bandwidth 710, and a size for one of the return links 750 or 770. Alternatively, the parameters 780 could be defined with the frequencies at either end of the bandwidth 710, $FU_L$ and $FD_H$, as well as one of the middle frequencies, $FU_M$ or $FD_M$.

In certain embodiments, each frequency parameter may actually define a certain range of frequencies to separate the portions of bandwidth. The size of the frequency ranges depends on the quality of the filters used to separate the portions of bandwidth. Higher quality filters need less room for error, and can, therefore, operate properly using smaller separations between portions of bandwidth.

Figure 8:
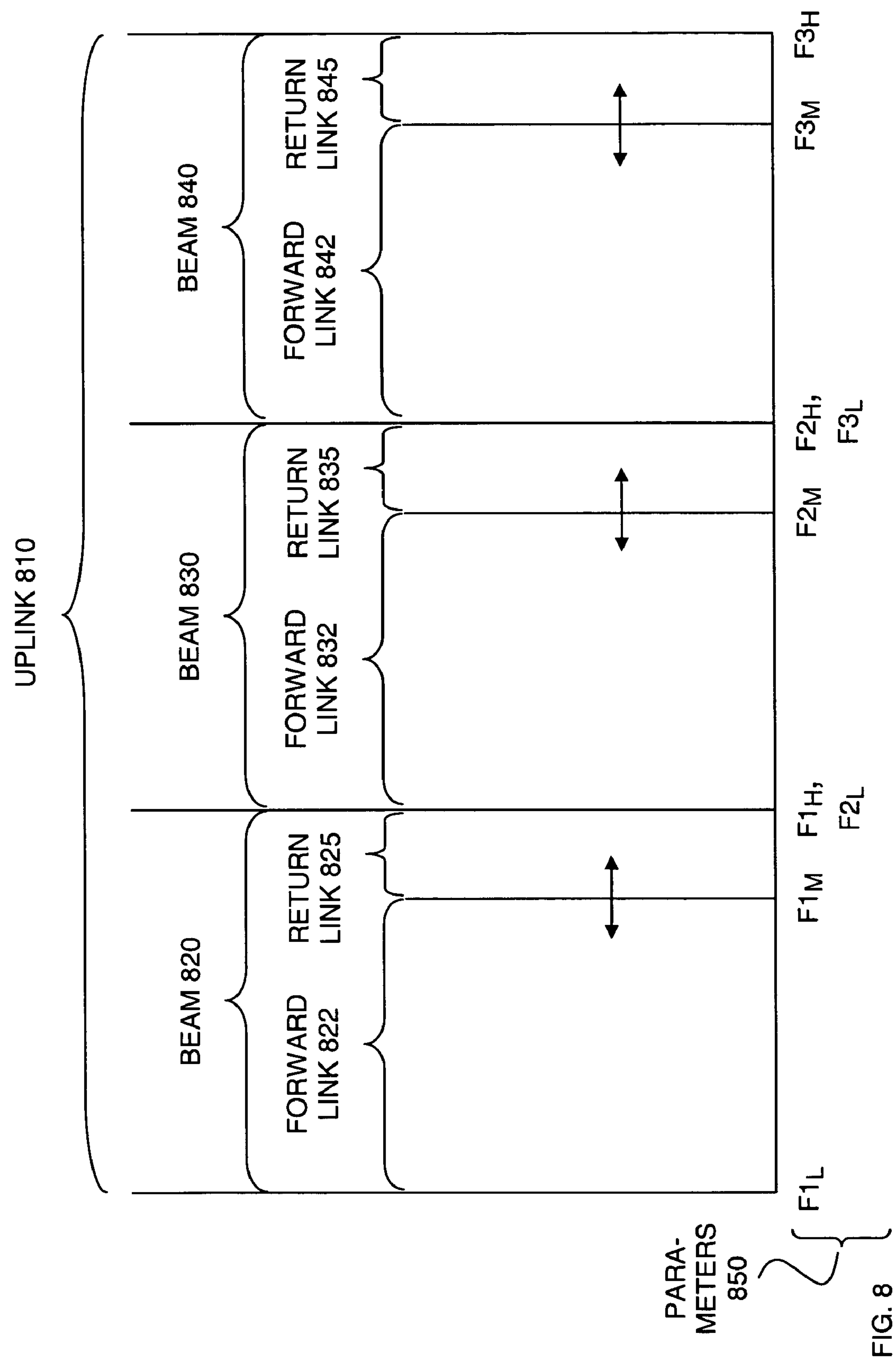
FIG. 8 illustrates one embodiment of the allocation of bandwidth for an uplink including three beams.

FIG. 8 illustrates one embodiment of how bandwidth is allocated among three beams in an uplink 810. A downlink (not shown) could have the same available bandwidth and include the same division of the bandwidth among beams. In the illustrated embodiment, the uplink 810 is divided into three equal beam portions, 820, 830, and 840. Each beam portion is divided into forward and return portions. Specifically, beam 820 includes forward link 822 and return link 825. Beam 830 includes forward link 832 and 835. And, beam 840 includes forward link 842 and return link 845. The boundaries between the various sections are defined by parameters 850. In the illustrated embodiment, the middle frequencies, $F1_M$, $F2_M$, and $F3_M$, are variable and programmable. In alternative embodiments, additional ones of the parameters 850 are programmable to reallocate bandwidth among beams.

The embodiment of FIG. 8 can similarly illustrate the allocation of bandwidth within a sub-band, such as one of sub-bands 322 from FIG. 3. In which case, the illustrated embodiment only shows the uplink portion of a sub-band. The sub-band could also include a downlink portion having an equivalent bandwidth allocation.

Figure 9:
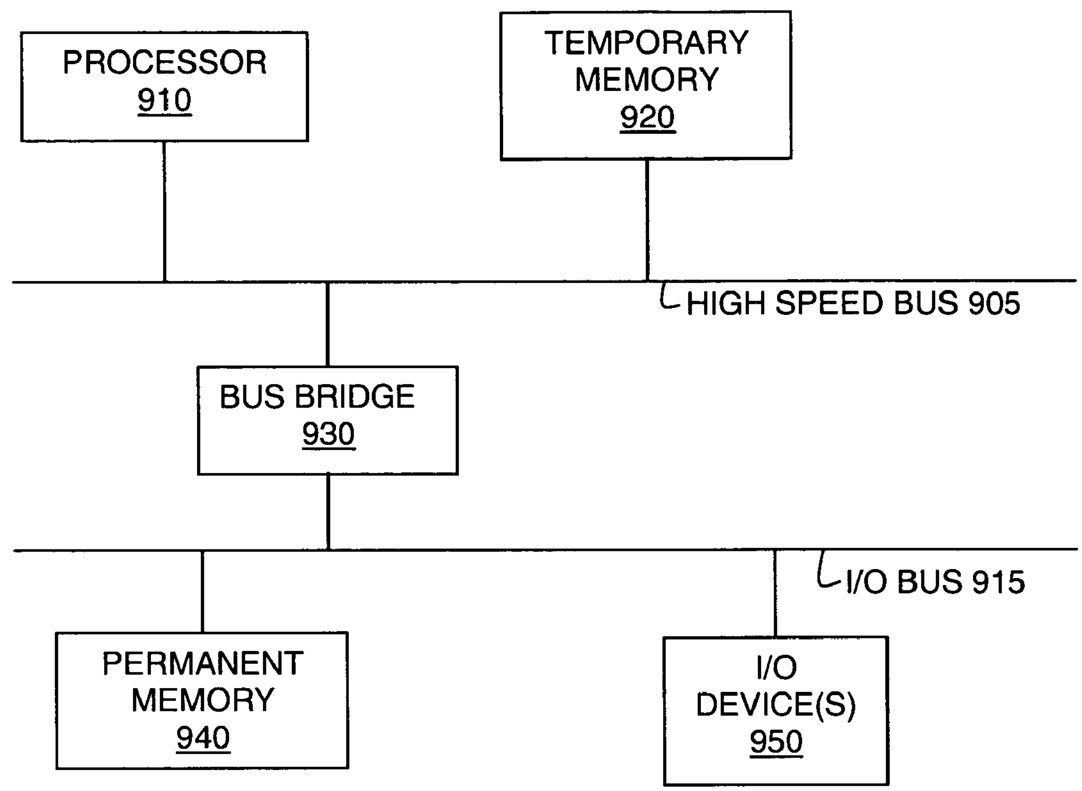
FIG. 9 illustrates one embodiment of a hardware system to implement various embodiments.

Various embodiments of the present invention use computational resources to carry out the above-described functionality. FIG. 9 illustrates one embodiment of a hardware system intended to represent a broad category of computer systems such as personal computers, workstations, and/or embedded systems. In the illustrated embodiment, the hardware system includes processor 910 coupled to high speed bus 905, which is coupled to input/output (I/O) bus 915 through bus bridge 930. Temporary memory 920 is coupled to bus 905. Permanent memory 940 is coupled to bus 915. I/O device(s) 950 is also coupled to bus 915. I/O device(s) 950 may include a display device, a keyboard, one or more external network interfaces, etc.

Certain embodiments may include additional components, may not require all of the above components, or may combine one or more components. For instance, temporary memory 920 may be on-chip with processor 910. Alternatively, permanent memory 940 may be eliminated and temporary memory 920 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternative internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 9. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 940.

Figure 10:
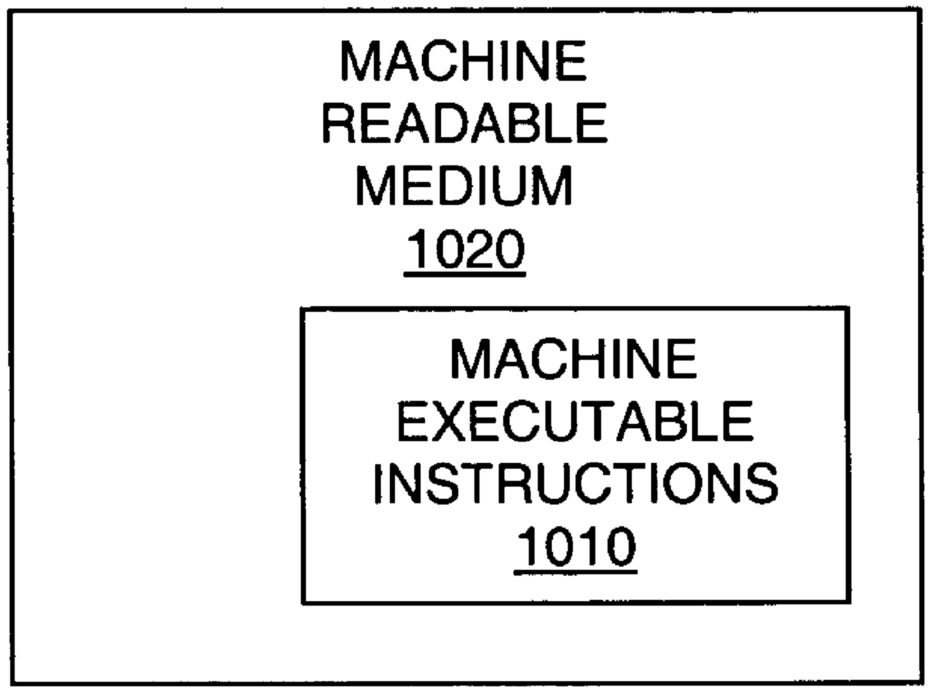
FIG. 10 illustrates one embodiment of a machine-readable medium to store executable instructions to implement various embodiments of the present invention.

Alternatively, as shown in FIG. 10, the software routines can be machine executable instructions 1010 stored using any suitable machine readable storage medium 1020, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 950 of FIG. 9.

From whatever source, the instructions may be copied from the storage device into temporary memory 920 and then accessed and executed by processor 910. In one implementation, these software routines are written in the C programming language. It is to be appreciated, however, that these routines may be implemented in any of a wide variety of programming languages.

In alternative embodiments, the present invention is implemented in discrete hardware or firmware. For example, one or more application specific integrated circuits (ASICs) could be programmed with one or more of the above described functions of the present invention. In another example, one or more functions could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions. In yet another example, a combination of hardware and software could be used to implement one or more functions.

In an alternative embodiment of the apparatus, a communications device, includes a receiver and a transmitter, that are coupled to each other. The receiver and transmitter are each adapted for use in a high altitude environment, that is in a high-flying aircraft or aboard a satellite. The communications device also includes control circuitry, coupled to the receiver and transmitter, adapted to control operating characteristics of the receiver and transmitter based, at least in part, upon one or more instructions for allocating channel capacity between an uplink and a downlink. It is noted that channel capacity refers to an amount of traffic that can be handled. In some embodiments, changes in channel capacity, or traffic handling capacity, are achieved by changing the amount of frequency bandwidth allocated between a forward and a return link, such as for example an uplink. In some embodiments, the communications device may also include circuitry, or any suitable type of computational resources, for monitoring the amount of forward and return traffic processed by the communications device.

In an alternative embodiment of the method used, a method of operating a communications system, includes establishing a first portion of a frequency bandwidth to be received and processed by a satellite as a forward uplink, and a second portion of that frequency bandwidth to be received and processed by the satellite as a return uplink, where the first and second portions make up the total of the frequency bandwidth. The traffic volumes on each of the forward and return uplinks can then be monitored, either by the satellite or by a ground station such as a gateway or a centralized communication system controller. Based upon the measured traffic volumes, the gateway, for example, can determine a third portion of the frequency bandwidth to be received and processed by a satellite as a forward uplink, and a fourth portion of the frequency bandwidth to be received and processed by the satellite as a return uplink. Again, the third and fourth portions make up the total of the frequency bandwidth. The gateway may then transmit instructions to the satellite, where the satellite includes circuitry responsive to the transmitted instructions, such that the amount of frequency bandwidth allocated to the forward and return uplinks is allocated in proportion to the monitored traffic volume on each of the forward and return uplinks.

Thus, satellite-based programmable allocation of bandwidth for forward and return links has been described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the subjoined claims.

What is claimed is:

1. A method, comprising:

receiving a filter parameter at a satellite in orbit;

receiving an input signal at the satellite;

programming a filter in the satellite to separate a plurality of sub-signals from the input signal based on the filter parameter;

filtering the input signal into the plurality of sub-signals as programmed based on the filter parameter translating the plurality of sub-signals into an output signal, wherein translating the plurality of sub-signals comprises:

multiplying the first sub-signal by a first number to produce a first amplified signal;

multiplying the second sub-signal by a second number to produce a second amplified signal, the second number being different from the first number; and adding the first amplified signal and the second amplified signal; and transmitting the output signal from the satellite; wherein:

the input signal comprises an uplink from a plurality of earth stations to the satellite, the plurality of earth stations comprising a gateway and a user station;

the output signal comprises a downlink from the satellite to the plurality of earth stations;

and the plurality of sub-signals comprise a first sub-signal and a second sub-signal, wherein the first sub-signal comprises a forward link from the gateway to the user station, and the second sub-signal comprises a return link from the user station to the gateway.

2. The method of claim 1, wherein the filter parameter comprises at least one of a high frequency limit for the input signal; a low frequency limit for the input signal, a median frequency to separate a first sub-signal from a second sub-signal within the plurality of sub-signals, and a set of frequency boundaries for each of the plurality of sub-signals.

3. The method of claim 1, further comprising:

applying different gain amounts to selected ones of the plurality of sub-signals.

4. The method of claim 1, wherein filtering the input signal comprises:

sampling the input signal at a sample rate to produce a sample stream;

quantizing each sample of the sample stream into a particular number of bits; and processing the sample stream into the plurality of sub-signals.

5. The method of claim 1, wherein the input signal further comprises uplinks from a plurality of beams servicing the plurality of earth stations and the output signal comprises downlinks to the plurality of beams, and wherein translating the plurality of sub-signals into the output signal comprises:

switching the plurality of sub-signals from particular uplinks to particular downlinks.

6. The method of claim 5, wherein switching the plurality of sub-signals comprises assigning at least one of the plurality of sub-signals received from an uplink corresponding to a particular beam to a downlink corresponding to a different beam.

7. The method of claim 1, further comprising:

receiving an original signal at the satellite, the original signal having a first center frequency and a first bandwidth; and down-converting the original signal to the input signal, the input signal having a second center frequency equal to one-half of the bandwidth plus a frequency margin, and the input signal having the first bandwidth.

8. The method of claim 1, further comprising:

receiving a first signal at the satellite, the first signal having a bandwidth;

down-converting the first signal to a first intermediate frequency (IF);

filtering the down-converted first signal so as to produce a plurality of N intermediate signals, each of the intermediate signals having 1/N of the bandwidth; and down-converting each of the intermediate signals to a plurality of component signals, the plurality of component signals including the input signal, each of the component signals having a high frequency equal to 1/N of the bandwidth plus a frequency margin, and each of the component signals having 1/N of the bandwidth.

9. An apparatus, comprising:

a satellite configured to receive a filter parameter, wherein the filter parameter comprises at least one of a high frequency limit for the input signal, a low frequency limit for the input signal, a median frequency to separate a first sub-signal from a second sub-signal within the plurality of sub-signals;

the satellite further comprising:

a programmable filter configured to separate a plurality of sub-signals from an input signal based on the filter parameter; and a frequency translator configured to translate the plurality of sub-signals into an output signal, wherein the frequency translator comprises:

a first digital multiplier configured to multiply the first sub-signal by a first number to produce a first amplified signal;

a second digital multiplier configured to multiply the second sub-signal by a second number to produce a second amplified signal, the second number being different from the first number; and a digital adder configured to add the first amplified signal and the second amplified signal; and a transmitter configured to transmit the output signal from the satellite; wherein the input signal comprises an uplink from a plurality of earth stations to the satellite, the plurality of earth stations comprising a gateway and a user station;

the output signal comprises a downlink from the satellite to the plurality of earth stations;

and the plurality of sub-signals comprise a first sub-signal and a second sub-signal, wherein the first sub-signal comprises a forward link from the gateway to the user station, and the second sub-signal comprises a return link from the user station to the gateway.

10. The apparatus of claim 9, wherein the frequency translator further comprises:

a programmable amplifier configured to apply different gain amounts to selected ones of the plurality of sub-signals.

11. The apparatus of claim 9, wherein the programmable filter further comprises:

a sampler configured to sample the input signal at a sample rate to produce a stream of samples each having a particular number of bits; and a processor configured to process each sample into the plurality of sub-signals.

12. The apparatus of claim 9, wherein the input signal further comprises uplinks from a plurality of beams servicing the plurality of earth stations and the output signal further comprises downlinks to the plurality of beams, and wherein the frequency translator comprises:

a switch matrix configured to switch the plurality of sub-signals from particular uplinks to particular downlinks.

13. The apparatus of claim 12, wherein the switch matrix is further configured to assign at least one of the plurality of sub-signals received from an uplink corresponding to a particular beam to a downlink corresponding to a different beam.

14. The apparatus of claim 9, further comprising:

a down-converter configured to receive an original signal at the satellite, the original signal having a first center frequency and a bandwidth, the down-converter adapted to down-convert the original signal to the input signal, the input signal having a second center frequency equal to one-half of the bandwidth plus a frequency margin, and the input signal having the bandwidth.

15. The apparatus of claim 14, further comprising:

an analog filter configured to receive an original signal at the satellite, the original signal having a bandwidth, the analog filter to filter the original signal into a plurality of N intermediate signals, each of the intermediate signals having 1/N of the bandwidth; and a down-converter configured to down-convert each of the intermediate signals to a plurality of component signals, the plurality of component signals including the input signal, each of the component signals having a high frequency equal to 1/N of the bandwidth plus a frequency margin, and each of the component signals having 1/N of the bandwidth.

16. A method of operating a communications system, comprising:

establishing a first portion of a frequency bandwidth to be received and processed by a satellite as a forward uplink, and a second portion of the frequency bandwidth to be received and processed by the satellite as a return uplink, the first and second portions comprising the total of the frequency bandwidth;

monitoring traffic volume on each of the forward and return uplinks;

determining a third portion of the frequency bandwidth to be received and processed by a satellite as a forward uplink, and a fourth portion of the frequency bandwidth to be received and processed by the satellite as a return uplink, the third and fourth portions comprising the total of the frequency bandwidth;

transmitting instructions to the satellite, the satellite including circuitry responsive to the transmitted instructions, such that the amount of frequency bandwidth allocated to the forward and return uplinks is allocated in proportion to the monitored traffic volume on each of the forward and return uplinks.

17. The method of claim 16, wherein monitoring traffic volume, determining the third and fourth portions, and transmitting instructions, are performed by a gateway.

18. Apparatus for use in operating a communications system, comprising:

means for establishing a first portion of a frequency bandwidth to be received and processed by a satellite as a forward uplink, and a second portion of the frequency bandwidth to be received and processed by the satellite as a return uplink, the first and second portions comprising the total of the frequency bandwidth;

means for monitoring traffic volume on each of the forward and return uplinks;

means for determining a third portion of the frequency bandwidth to be received and processed by a satellite as a forward uplink, and a fourth portion of the frequency bandwidth to be received and processed by the satellite as a return uplink, the third and fourth portions comprising the total of the frequency bandwidth; and means for transmitting instructions to the satellite, the satellite including circuitry responsive to the transmitted instructions, such that the amount of frequency bandwidth allocated to the forward and return uplinks is allocated in proportion to the monitored traffic volume on each of the forward and return uplinks.

19. A non-transitory computer-readable medium including instructions stored thereon, the instructions facilitating operations comprising:

establishing a first portion of a frequency bandwidth to be received and processed by a satellite as a forward uplink, and a second portion of the frequency bandwidth to be received and processed by the satellite as a return uplink, the first and second portions comprising the total of the frequency bandwidth;

monitoring traffic volume on each of the forward and return uplinks;

determining a third portion of the frequency bandwidth to be received and processed by a satellite as a forward uplink, and a fourth portion of the frequency bandwidth to be received and processed by the satellite as a return uplink, the third and fourth portions comprising the total of the frequency bandwidth; and transmitting instructions to the satellite, the satellite including circuitry responsive to the transmitted instructions, such that the amount of frequency bandwidth allocated to the forward and return uplinks is allocated in proportion to the monitored traffic volume on each of the forward and return uplinks.

* * * * *